(12) United States Patent
Kubo

(10) Patent No.: US 10,279,631 B2
(45) Date of Patent: May 7, 2019

(54) PNEUMATIC TIRE

(71) Applicant: SUMITOMO RUBBER INDUSTRIES, LTD., Kobe-shi, Hyogo (JP)

(72) Inventor: Hokuto Kubo, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 310 days.

(21) Appl. No.: 15/114,158

(22) PCT Filed: Dec. 1, 2014

(86) PCT No.: PCT/JP2014/081783
§ 371 (c)(1),
(2) Date: Jul. 26, 2016

(87) PCT Pub. No.: WO2015/111302
PCT Pub. Date: Jul. 30, 2015

(65) Prior Publication Data
US 2017/0008346 A1 Jan. 12, 2017

(30) Foreign Application Priority Data
Jan. 27, 2014 (JP) .................................. 2014-012639

(51) Int. Cl.
*B60C 11/03* (2006.01)
*B60C 11/12* (2006.01)
*B60C 11/13* (2006.01)

(52) U.S. Cl.
CPC ...... *B60C 11/0302* (2013.01); *B60C 11/0306* (2013.01); *B60C 11/1392* (2013.01);
(Continued)

(58) Field of Classification Search
CPC . B60C 11/03; B60C 11/0302; B60C 11/0306; B60C 2011/0379;
(Continued)

(56) References Cited

U.S. PATENT DOCUMENTS

2004/0134582 A1 7/2004 Murata
2008/0236714 A1 10/2008 Kojima
(Continued)

FOREIGN PATENT DOCUMENTS

EP 2463122 A2 6/2012
EP 2610086 A1 7/2013
(Continued)

OTHER PUBLICATIONS

International Search Report, issued in PCT/JP2014/081783, PCT/ISA/210, dated Feb. 24, 2015.
(Continued)

*Primary Examiner* — Eric Hug
(74) *Attorney, Agent, or Firm* — Birch, Stewart, Kolasch & Birch LLP

(57) ABSTRACT

A pneumatic tire 1 is provided in the tread portion 2 with a pair of center main grooves 3 arranged on both sides of the tire equator C, and a pair of shoulder main grooves 4 arranged on both sides thereof, and is provided on both sides of the equator C with middle land portions 6 defined between the center main grooves 3 and the shoulder main grooves 4. The middle land portions 6 are provided with a plurality of middle oblique grooves 10. Each middle oblique groove 10 extends toward the tire equator C from the outer end 10o in the tire axial direction communicating with the shoulder main groove 4, and the inner end 10i terminates without reaching to the center main groove 3. In an outer end 10o side of the middle oblique groove 10, an outer shallow bottom portion 12 having a depth less than the maximum depth of the middle tilted groove 10 is provided.

7 Claims, 6 Drawing Sheets

(52) U.S. Cl.
CPC ..... *B60C 11/125* (2013.01); *B60C 2011/0367* (2013.01); *B60C 2011/0369* (2013.01); *B60C 2011/0374* (2013.01); *B60C 2011/0379* (2013.01); *B60C 2011/0381* (2013.01); *B60C 2011/0383* (2013.01); *B60C 2011/0388* (2013.01)

(58) Field of Classification Search
CPC ..... B60C 2011/0374; B60C 2011/0369; B60C 2011/0381; B60C 2011/0383; B60C 2011/0388; B60C 2011/0367; B60C 11/12; B60C 11/125; B60C 11/13; B60C 11/1392
USPC ............ 152/209.9, 209.18, 209.25, 901, 902
See application file for complete search history.

(56) References Cited

U.S. PATENT DOCUMENTS

| | | | |
|---|---|---|---|
| 2009/0266458 A1* | 10/2009 | Takahashi | B60C 11/0302 152/209.18 |
| 2010/0139826 A1 | 6/2010 | Matsumoto | |
| 2012/0168050 A1* | 7/2012 | Terashima | B60C 11/0083 152/209.25 |
| 2012/0267022 A1* | 10/2012 | Tagashira | B60C 11/0309 152/209.25 |
| 2013/0068360 A1 | 3/2013 | Tamugi | |
| 2013/0112325 A1 | 5/2013 | Mukai | |
| 2013/0167996 A1 | 7/2013 | Oda | |
| 2013/0167997 A1* | 7/2013 | Hayashi | B60C 11/04 152/209.18 |

FOREIGN PATENT DOCUMENTS

| | | |
|---|---|---|
| JP | 5-254312 A | 10/1993 |
| JP | 8-72510 A | 3/1996 |
| JP | 2001-138716 A | 5/2001 |
| JP | 2004-106747 A | 4/2004 |
| JP | 2004-210189 A | 7/2004 |
| JP | 2010-132236 A | 6/2010 |
| JP | 2012-140091 A | 7/2012 |
| JP | 2013-49325 A | 3/2013 |
| JP | 2013-63701 A | 4/2013 |
| JP | 2013-100020 A | 5/2013 |
| JP | 2013-139194 A | 7/2013 |

OTHER PUBLICATIONS

Written Opinion of the International Searching Authority, issued in PCT/JP2014/081783, PCT/ISA/237, dated Feb. 24, 2015.
Extended European Search Report for European Application No. 14880068.3, dated Aug. 4, 2017.

* cited by examiner

PNEUMATIC TIRE

TECHNICAL FIELD

The present invention relates to a pneumatic tire having a good steering stability.

BACKGROUND ART

In the following Patent Document 1, a pneumatic tire provided in a middle land portion with inclined grooves is described.

However, as the inclined grooves of the Patent Document 1 extend completely across the middle land portion, the rigidity of the middle land portion is low, and there is room for further improvement in the steering stability.

PRIOR ART DOCUMENT

Patent Document

Patent Document 1: Japanese Unexamined Patent Publication No. 2004-210189

DISCLOSURE OF THE INVENTION

Problems that the Invention is to Solve

The present invention was made in view of the circumstances described above, and a main object is to provide a pneumatic tire having a good steering stability.

Means for Solving the Problems

The present invention is a pneumatic tire in which, by being provided with
a pair of center main grooves disposed on both sides of the tire equator and
a pair of shoulder main grooves disposed on both sides of the center main grooves,
the tread portion is provided on both sides of the tire equator with middle land portions which are defined between the center main grooves and the shoulder main grooves,
and which is characterized in that
each of the middle land portions is provided with a plurality of middle oblique grooves,
each of the middle oblique grooves extends toward the tire equator from the axially outer end communicating with the shoulder main groove, and terminates so that the axially inner end does not communicate with the center main groove,
an outer end side of the middle oblique groove is provided with an outer shallow bottom portion having a groove depth smaller than the maximum groove depth of the middle oblique groove.

In the pneumatic tire according to the present invention, it is preferable that the above-mentioned inner end side of the middle oblique groove is provided with an inner shallow bottom portion having a depth smaller than the maximum groove depth of the middle oblique groove.

In the pneumatic tire according to the present invention, it is preferable that the depth of the above-mentioned inner shallow bottom portion is smaller than the depth of the above-mentioned outer shallow bottom portion.

In the pneumatic tire according to the present invention, it is preferable that the groove bottom surface of the outer shallow bottom portion is provided with a sipe extending along the middle oblique groove.

In the pneumatic tire according to the present invention, it is preferable that the tread portion is provided on the outside of each of the shoulder main grooves with a shoulder land portion, each of the shoulder land portions is provided with a plurality of shoulder lateral grooves, the shoulder lateral grooves include first shoulder lateral grooves, and second shoulder lateral grooves whose width is smaller than the first shoulder lateral grooves, and the first shoulder main grooves and the second shoulder main grooves are arranged alternately in the tire circumferential direction.

In the pneumatic tire according to the present invention, it is preferable that the groove width of the second shoulder lateral grooves is from 70% to 90% of the groove width of the first shoulder lateral grooves.

In the pneumatic tire according to the present invention, it is preferable that the shoulder lateral grooves extend to the tread edges of the tread portion, and the angle of the shoulder lateral grooves with respect to the tire circumferential direction is not less than 80 degrees at the tread edges.

In the pneumatic tire according to the present invention, it is preferable that the tread portion is provided between the center main grooves with a center land portion, and the center land portion is a rib provided with center lug grooves extending from the center main grooves and terminating without reaching to the tire equator.

In the pneumatic tire according to the present invention, it is preferable that the length in the tire axial direction of the center lug grooves is not more than 30% of the width of the center land portion.

Effect of the Invention

In the present invention, a plurality of the middle oblique grooves are formed in each of the middle land portions. Each of the middle oblique grooves has an outer end in the tire axial direction communicating with the shoulder main groove, and an inner end in the tire axial direction terminated without communicating with the center main groove. Thus, the middle oblique grooves can discharge the water film between the middle land portions and the road surface toward the outside of the tire via the shoulder main grooves.

Further, as the middle oblique grooves are not extended completely across the middle land portion, the middle land portions are provided with high rigidity, and good steering stability can be exhibited.

Further, as the outer end side of the middle oblique groove is provided with the outer shallow bottom portion having the depth smaller than the maximum groove depth of the middle oblique grooves, deformation of the middle land portions during cornering can be effectively suppressed, and even better steering stability can be exhibited.

MODE FOR CARRYING OUT THE INVENTION

Hereinafter, an embodiment of the present invention will be described with reference to the drawings.

Figure 1:
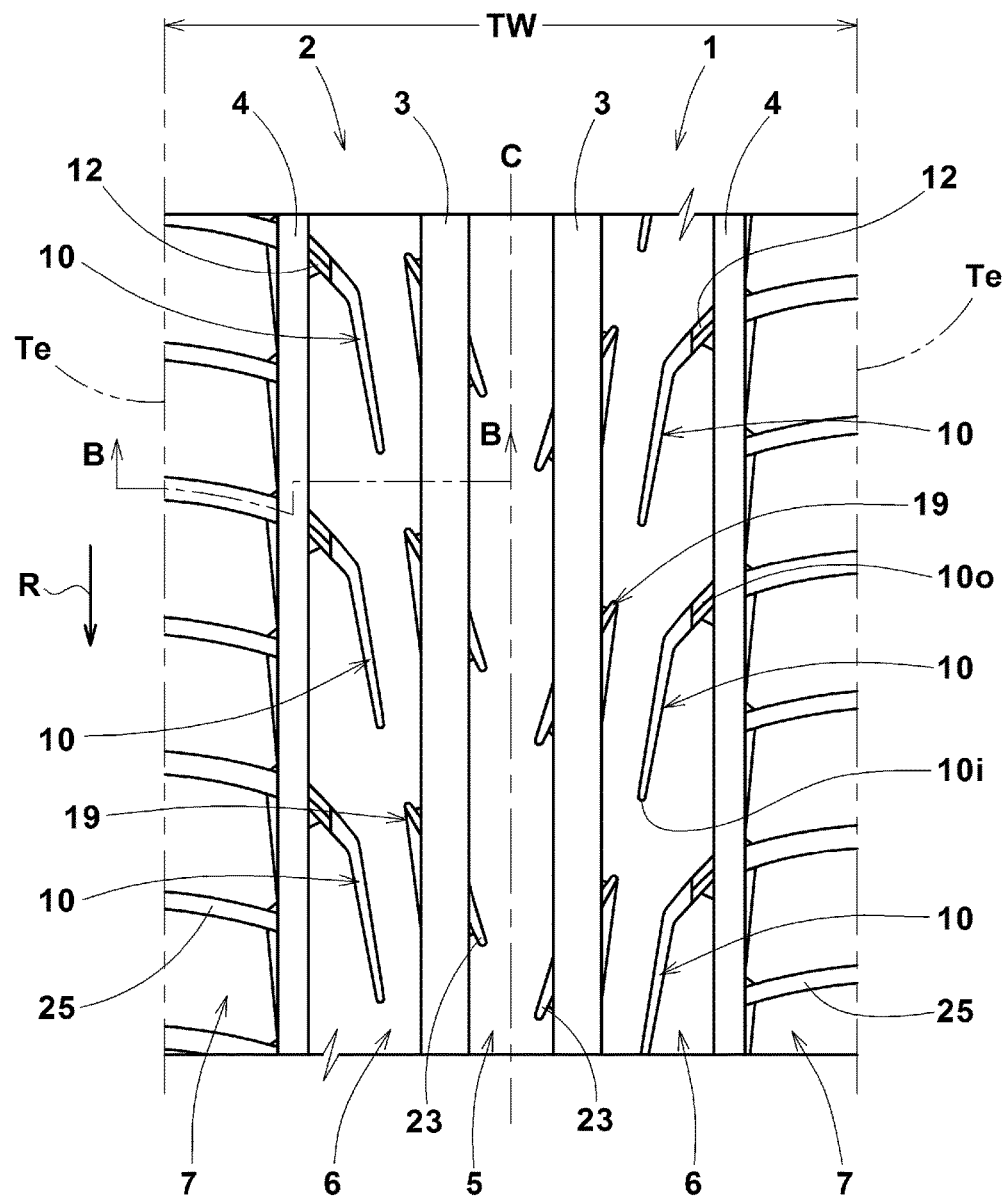
FIG. 1 A development view of a tread portion of a pneumatic tire as an embodiment of the present invention.

In FIG. 1, there is shown a development view of a tread portion 2 of a pneumatic tire 1 as an embodiment of the present invention. The pneumatic ti re in the present embodiment is embodied as a passenger car radial tire 1 whose rotational direction R is specified. The rotational direction R is indicated in the sidewall portions of the pneumatic tire 1 by using characters, symbol or the like, The tread portion 2 is provided with a pair of center main grooves 3, 3 disposed on both sides of the tire equator C, and a pair of shoulder main grooves 4, 4 disposed on both sides thereof.

It is desirable that these main grooves 3 and 4 have groove depths of, for example, not less than 6 mm, more preferably 7 to 11 mm so that sufficient drainage performance can be obtained.

The center main groove 3 extends linearly along the tire circumferential direction for example. Thereby, a good drainage effect can be obtained in the central region of the tread portion 2.

It is also possible to form the center main groove 3 in a zigzag shape.

The center main groove 3 has a relatively large groove width. In order to obtain a favorable drainage performance, it is desirable for the center main groove 3 to have a groove width of, for example, not less than 3%, more preferably not less than 5% of the tread width TW.

On the other hand, in order to obtain good steering stability, the groove width of the center main groove 3 is, for example, preferably not more than 10%, more preferably not more than 8% of the tread width TW.

Here, the tread width TW is a distance in the tire axial direction between the tread edges Te of the tire under a normal state. The "normal state" is a state of the tire 1 which is mounted on the normal rim, and filled to the normal inner pressure, and loaded with no load.

Unless otherwise noted, the various dimensions of the tire are values under this normal state.

The "normal rim" is a wheel rim specified for the tire by a standard included in a standardization system on which the tire is based, for example, the "normal rim" in JATMA, "DeSign Rim" in TRA, and "measuring Rim" in ETRTO.

The "normal inner pressure" is air pressure specified for the tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. However, in case of tires for passenger cars, the "normal inner pressure" is 180 kPa uniformly.

The "tread edges" are the axially outermost ground contacting positions of the tread when the tire under the normal state is loaded with the normal load and pressed onto a flat surface at a camber angle of zero degree.

The "normal load" is a load specified for the tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. However, in case of tires for passenger cars, the normal load is a load corresponding to 88% of the above-mentioned load.

For example, the shoulder main grooves 4 extend linearly along the tire circumferential direction. Thereby, a good drainage effect can be obtained in an outer region of the tread portion 2. It is also possible to form the shoulder main groove 4 in a zigzag shape.

In order to obtain a favorable drainage performance, it is desirable for the shoulder main grooves 4 to have a groove width of, for example, not less than 2%, more preferably not less than 3% of the tread width TW.

In order to obtain good steering stability, it is desirable that the groove width of the shoulder main grooves 4 is, for example, not more than 9%, more preferably not more than 7% of the tread width TW.

In this embodiment, the shoulder main groove 4 has a groove width smaller than the center main groove 3.

By being provided with the center main grooves 3 and the shoulder main grooves 4, the tread portion 2 is divided into five land portions. The land portions 5 include a center land portion 5 defined between the center main grooves 3, 3, a pair of middle land portions 6 defined between the center main grooves 3 and the shoulder main grooves 4, and a pair of shoulder land portions 7 defined outside the shoulder main grooves 4.

The middle land portions 6 on both sides of the tire equator c have a great influence on the steering stability during cornering. In the present invention, in order to provide a good steering stability and drainage performance, each of the middle land portions 6 is provided with a plurality of middle oblique grooves 10.

Figure 2:
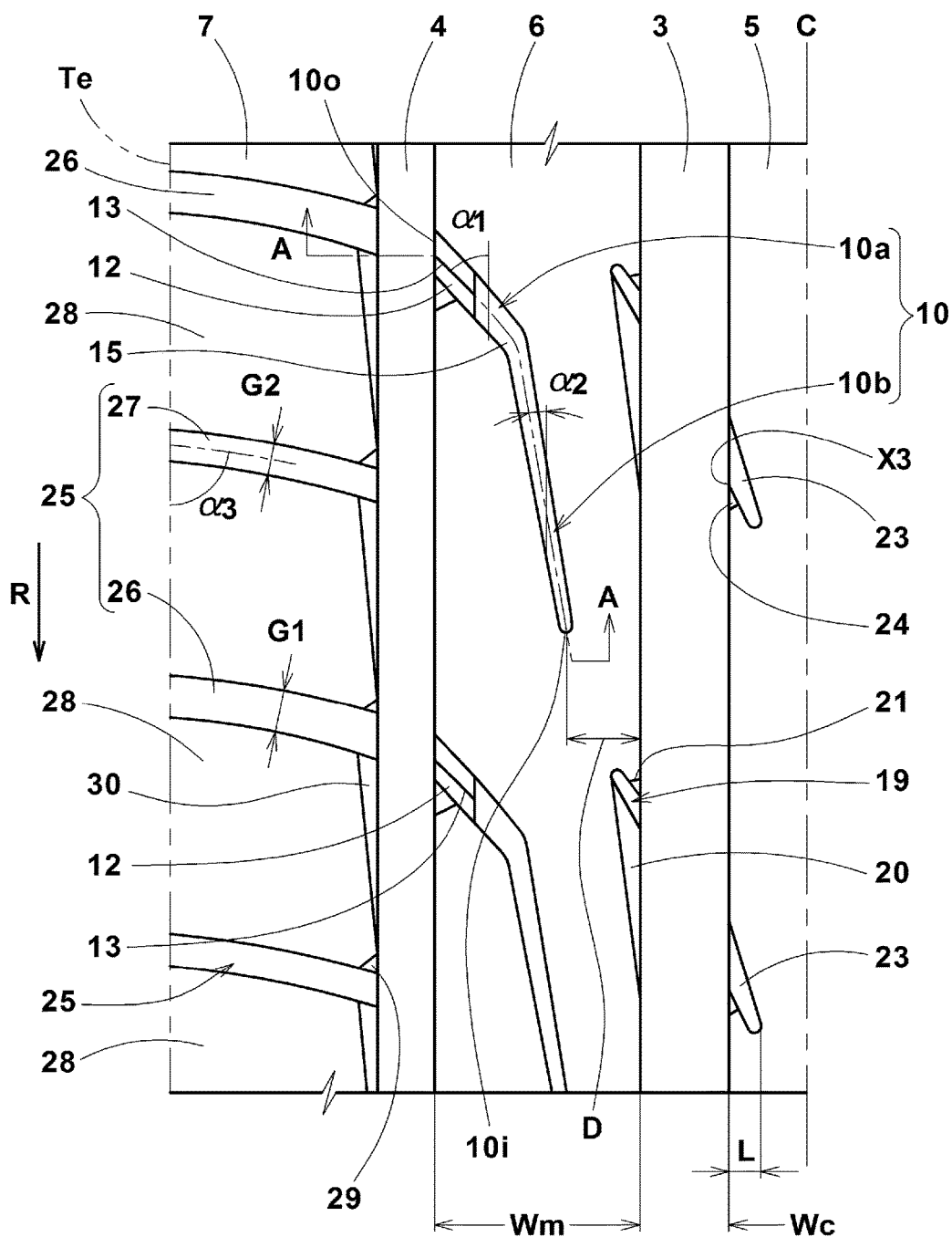
FIG. 2 A partial enlarged view of the middle land portion of FIG. 1.

In FIG. 2, there is shown a partially enlarged view of the middle land portion 6 of FIG. 1.

Each of the middle oblique grooves 10 extends from the outer end 10o to the inner end 10i in the tire axial direction.

The outer end 10o of the middle oblique groove 10 is in communication with the shoulder main groove 4.

The inner end 10i of the middle oblique groove 10 is terminated before the center main groove 3 without communicating therewith. Accordingly, the middle land portion 6 is formed as a rib which is a land portion extending continuously in the tire circumferential direction. Such ribs has a higher circumferential rigidity as compared with a row of blocks, and serves to improve the steering stability of the tire.

Each of the middle oblique grooves 10 extends toward the later contacting side in the rotational direction R from the inner end 10i to the outer end 10o.

As a result, as the middle oblique groove 10 contacts with the ground from the inner end 10i, water in the middle oblique groove 10 is pushed out toward the outer end 10o by the ground contact pressure of the tire during traveling, and the water is discharged effectively from the shoulder main groove 4.

In order to exert the steering stability and the drainage performance in a good balance, it is preferred that the distance D in the tire axial direction between the inner end 10i of the middle oblique groove 10 and the center main groove 3 is about 30% to 40% of the width Wm in the tire axial direction of the middle land portion 6.

The middle oblique groove 10 includes an outer portion 10a extending axially inwardly from the outer end 10o, and an inner portion 10b extending axially outwardly from the inner end 10i.

For example, the outer portion 10a has a large angle with respect to the tire circumferential direction than the inner portion 10b. Thereby, the middle oblique groove 10 is formed as a bent groove which is bent smoothly.

The middle oblique grooves 10 as described above can be increased in the lateral rigidity in an axially outer side of the middle land portion 6, while increasing the drainage performance in an axially inner side of the middle land portion 6.

In a preferred embodiment, the angle $\alpha 1$ of the inner portion 10b with respect to the tire circumferential direction is 35 to 60 degrees, and the angle $\alpha 2$ of the outer portion 10a with respect to the tire circumferential direction is 5 to 25 degrees.

Figure 3:
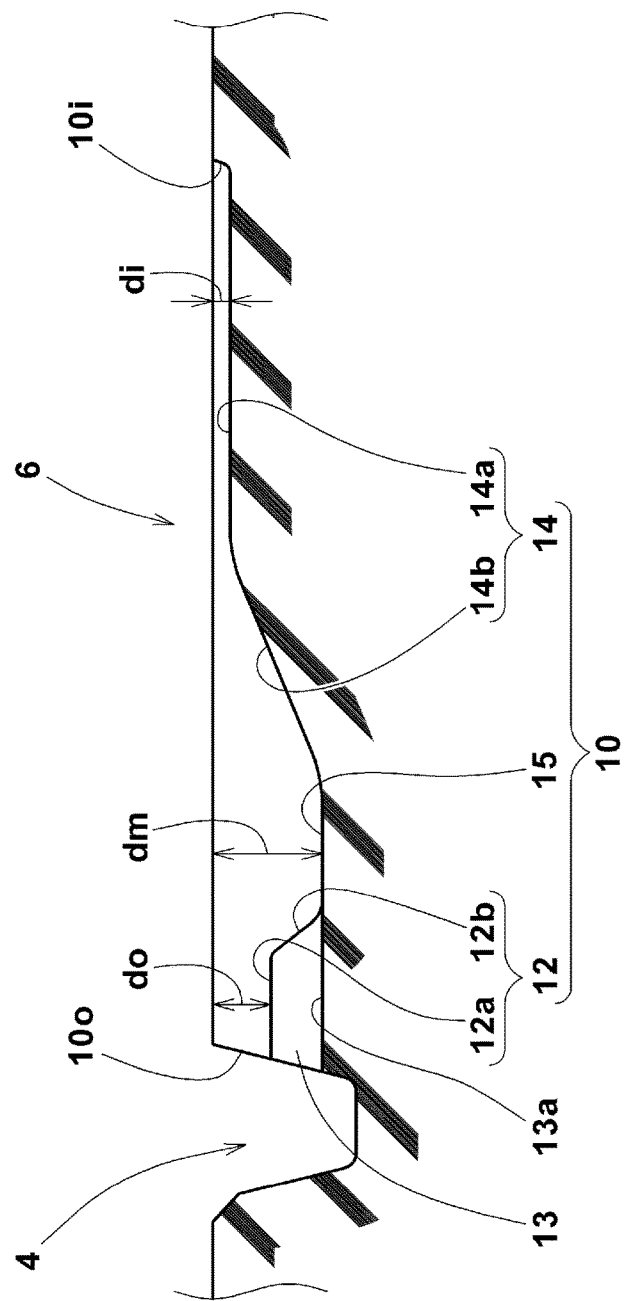
FIG. 3 A-A cross-sectional view of FIG. 2.

In FIG. 3, there is shown A-A sectional view of the middle oblique groove 10 of FIG. 2.

As apparent from FIG. 3, the middle oblique groove 10 is provided in an outer end 10o side with an outer shallow bottom portion 12.

The outer shallow bottom portion 12 has a groove depth (do) smaller than the maximum groove depth (dm) of the middle oblique groove 10.

In an outer side of the middle land portion 6, such outer shallow bottom portion 12 lessens the influence of the middle oblique groove 10 to reduce the rigidity of the land portion. Thus, the outer shallow bottom portion 12 suppresses the deformation of the middle land portion 6 during cornering, and improves the steering stability.

In order to enhance the above-described effect, it is more preferable that the groove depth (do) of the outer shallow bottom portion 12 is smaller.

On the other hand, if the groove depth (do) of the outer shallow bottom portion 12 becomes small, there is a possibility that the drainage performance and noise performance are deteriorated. From this point of view, the minimum groove depth (do) of the outer shallow bottom portion 12 is not less than 45%, more preferably not less than 50%, and preferably not more than 65%, more preferably not more than 60% of the maximum groove depth (dm) of the middle oblique groove 10.

In a preferred embodiment, the outer shallow bottom portion 12 comprises
a base part 12a extending in the longitudinal direction of the groove with the minimum groove depth (do), and
an inclined part 12b extending in the longitudinal direction of the groove from the base part 12a so that the groove depth is gradually increased.

The inclined part 12b is smoothly continued to the deepest point 15 having the maximum groove depth (dm).

Such inclined part 12b can suppress an abrupt rigidity change between the base part 12a of the outer shallow bottom portion 12 and the deepest point 15, and can effectively prevent the strain from concentrating there.

In this embodiment, the outer shallow bottom portion 12 is provided to extend over a predetermined range including the outer end 10o of the middle oblique groove 10.

In order to sufficiently exhibit the effect described above, it is desirable that the outer shallow bottom portion 12 is formed to extends over a range of 4 to 8 mm, for example, along the middle oblique groove 10.

As shown in FIGS. 2 and 3, the groove bottom surface of the outer shallow bottom portion 12 is provided with a sipe 13 extending along the middle oblique groove 10.

For example, the sipe 13 is like a cut whose width is 1 mm or less.

Even if the tread portion 2 is worn to such a state that the outer shallow bottom portion 12 contacts with the ground, the sipe 13 can communicate the middle oblique groove 10 with the shoulder main groove 4, and prevent the deterioration of the drainage performance.

Furthermore, during traveling, the air compressed in the middle oblique groove 10 is discharged to the shoulder main groove 4 through the sipe 13. Therefore, the sipe 13 suppresses the increase in the pumping noise generated in the middle oblique groove 10 and the like.

Preferably, the sipe 13 extends at the center position of the width of the outer shallow bottom portion 12. The depth of the sipe 13 is not particularly limited, but it is desirable that, for example, as shown in FIG. 3, the bottom portion 13a of the sipe 13 reaches to a position at the maximum groove depth (dm) of the middle oblique groove 10.

Such sipe 13 can allow the above described effect to be exhibited until the end of wear.

In a preferred embodiment, the middle oblique groove 10 is provided in its inner end 10i side with an inner shallow bottom portion 14.

The inner shallow bottom portion 14 has a depth smaller than the maximum groove depth (dm) of the middle oblique groove 10.

The inner shallow bottom portion 14 is able to further lessen the effect of the middle oblique groove 10 to lower the rigidity of the middle land portion 6, while ensuring the drainage in the middle oblique groove 10.

When traveling straight, a large ground contact pressure tends to act on the axially inner side of the middle land portion 6 as compared to the outer side.

It is therefore preferable that, based on such ground pressure difference, for example, the inner shallow bottom portion 14 is provided with a smaller depth than the outer shallow bottom portion 12, or is formed along the longitudinal direction of the groove so as to extend more than the extent of the outer shallow bottom portion 12.

In the present embodiment, the groove depth (di) of the inner shallow bottom portion 14 is smaller than the groove depth (do) of the outer shallow bottom portion 12, and it is formed along the longitudinal direction of the groove so as to extend more than the extent of the outer shallow bottom portion 12.

By being provided with the inner shallow bottom portion 14, the straight-running stability of the tire can be further improved.

In order to further enhance the above described effect, it is more preferable that the groove depth (di) in the inner shallow bottom portion 14 is smaller.

On the other hand, if the groove depth (di) in the inner shallow bottom portion 14 is too small, there is a possibility that the drainage by the middle oblique groove 10 is deteriorated.

From this point of view, the minimum groove depth (di) of the inner shallow bottom portion 14 is not less than 10%, more preferably not less than 15%, and preferably not more than 35%, more preferably not more than 30% of the maximum groove depth (dm) of the middle oblique groove 10.

In a preferred embodiment, the inner shallow bottom portion 14 comprises
a base part 14a extending in the longitudinal direction of the groove with the minimum groove depth (di), and
an inclined part 14b extending in the longitudinal direction of the groove from the base part 14a so that the groove depth gradually increases.

The inclined part 14b is smoothly continued to the deepest part 15. Such inclined part 14b can suppress an abrupt change in the rigidity between the base part 14a of the inner shallow bottom portion 14 and the deepest part 15, and can effectively prevent the strain from concentrating there.

In this embodiment, the inner shallow bottom portion 14 is formed to extend over a predetermined range including the inner end 10*i* of the middle oblique groove 10.

In a preferred embodiment, it is desirable that the inner shallow bottom portion 14 is formed to extend over a range of 40% to 60% of the inner portion 10*b* of the middle oblique groove 10.

The deepest part 15 of the middle oblique groove 10 is formed between the outer shallow bottom portion 12 and the inner shallow bottom portion 14.

It is desirable that for example the deepest part 15 has the maximum groove depth (dm) which is about 65-100%, more preferably 70-90% of the groove depth of the center main groove 3.

The deepest part 15 of the middle oblique groove 10 is, for example, formed to extend between the outer portion 10*a* and the inner portion 10*b* of the middle oblique groove 10 (i.e., includes the bent portion).

In a preferred embodiment, the inclined part 14*b* of the inner shallow bottom portion 14 has a gentler slope than the inclined part 12*b* of the outer shallow bottom portion 12. Thereby, it is possible to further reduce the rigidity change in the axially inner side of the middle land portion 6 where the ground contact pressure is higher.

As shown in FIGS. 1 and 2, in the present embodiment, the middle land portion 6 is further provided with a plurality of slots 19.

The plural slots 19 are disposed in the tire circumferential direction at substantially same pitches as the middle oblique grooves 10. The slots 19 extend from the center main groove 3 toward the tire axial direction, and terminate within the middle land portion 6.

In a preferred embodiment, the slots 19 extend at the substantially same angle as the outer portion 10*a* of the middle oblique groove 10. Such slots 19 maintain the rigidity in the axially inner side and outer side of the middle land portion 6 in a good balance, and prevent the occurrence of uneven wear.

Figure 4:
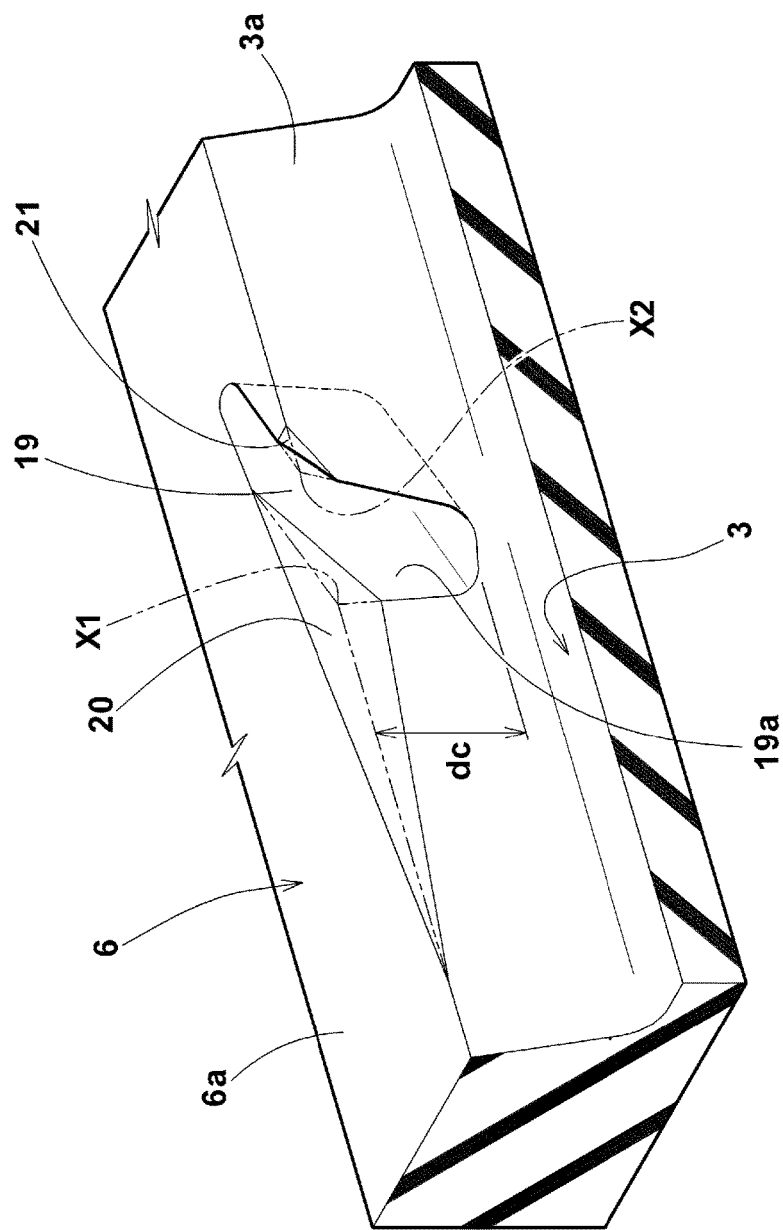
FIG. 4 A partial enlarged perspective view of an inner side in the ti re axial direction of the middle land portion.

In FIG. 4, there is shown a partial enlarged perspective view of an inner side in the tire axial direction of the middle land portion 6.

It is desirable that, for example, the depth dc of the slot 19 is in the same range as that for the maximum groove depth (dm) of the middle oblique groove 10.

In a preferred embodiment, a corner portion X1 on the obtuse angle side at which the slot 19 and the center main groove 3 intersect, is provided with a first chamfered portion 20.

The first chamfered portion 20 is a slope provided in the corner portion formed by the tread 6*a* of the middle land portion 6, a groove wall surface 3*a* of the center main groove 3, and a wall surface 19*a* of the slot 19.

As shown in FIG. 2, the first chamfered portion 20 is gradually decreased in the width in the tire axial direction as the distance from the slot 19 increases, so as to form a triangular shape in the plan view.

The first chamfered portion 20 can relax the stress concentration in the vicinity of the slot 19, and prevent the occurrence of rubber chipping and cracks therein.

Returning to FIG. 4, in a further preferred embodiment, a corner portion X2 on the acute angle side at which the slot 19 and the center main groove 3 intersect, is provided with a second chamfered portion 21.

The second chamfered portion 21 is a slope inclined inwardly in the tire radial direction toward the tip of the corner portion X2 from the tread 6*a* of the middle land portion 6.

The second chamfered portion 21 is also formed in a triangular shape in the plan view.

Such second chamfered portion 21 can also relax the stress concentration in the vicinity of the slot 19, and prevent the occurrence of rubber chipping and cracks therein.

As shown in FIGS. 1 and 2, the center land portion 5 is disposed between the middle land portions 6, 6.

The construction of the center land portion 5 is not particularly limited.

In a preferred embodiment, the center land portion 5 is provided with center lug grooves 23.

On each side of the center land portion 5, the plural center lug grooves 23 are disposed in the tire circumferential direction at the substantially same pitches as the middle oblique grooves 10.

The center lug grooves 23 extend toward the tire equator C from the respective center main grooves 3, and terminate within the center land portion 5 without reaching to the tire equator C. Thereby, the center land portion 5 is formed as a rib extending continuously in the tire circumferential direction.

The center lug grooves 23 mitigate the rigidity in the tire circumferential direction of the center land portion 5 to approximate the rigidity in the tire circumferential direction of the middle land portion 6.

Thereby, the rigidity of the tread portion 2 is changed moderately from the tire equator C to the middle land portion 6, and the steering stability is further improved.

As shown in FIG. 2, the length L in the tire axial direction of the center lug grooves 23 is preferably not more than 30% of the width wc of the center land portion 5.

If the length L is more than 30% of the width wc of the center land portion 5, there is a possibility that the steering stability is deteriorated.

In addition, the depth of the center lug groove 23 is, for example, preferably set in the same range as that for the maximum groove depth (dm) of the middle oblique groove 10.

In a preferred embodiment, a corner portion X3 on the acute angle side in which the center lug groove 23 and the center main groove 3 intersect, is provided with a third chamfered portion 24.

The third chamfered portion 24 is a slope inclined inwardly in the tire radial direction toward the tip of the corner portion X3 from the tread of the center land portion 5.

The third chamfered portion 24, is formed in a triangular shape in the plan view. Such third chamfered portion 21 can relax the stress concentration in the vicinity of the center lug groove 23, and suppress the occurrence of rubber chipping and cracks therein.

On the outsides in the tire axial direction of the middle land portions 6, the shoulder land portions 7 are disposed.

For example, Each of the shoulder land portions 7 is provided with a plurality of shoulder lateral grooves 25.

The shoulder lateral grooves 25 extend from the shoulder main grooves 4 to the tread edges Te. Accordingly, the shoulder land portions 7 are divided into a plurality of shoulder blocks 28. In order to provide better steering stability by increasing the lateral rigidity of the shoulder blocks 28, the shoulder lateral grooves 25 extend substantially in the tire axial direction. In a further preferred embodiment, at the positions of the tread edges Te, the angles α3 with respect to the tire circumferential direction of the shoulder lateral grooves 25 are preferably 80 to 90 degrees.

In the present embodiment, the shoulder lateral grooves 25 include first shoulder lateral grooves 26 having a groove width G1, and second shoulder lateral grooves 27 having a smaller groove width G2 than the first shoulder lateral grooves 26.

Preferably, the first shoulder lateral grooves 26 and the second shoulder lateral grooves 27 are arranged alternately in the tire circumferential direction. Such arrangement of the shoulder lateral grooves 25 can disperse the pitch noise due to the shoulder lateral grooves 25 during running into a wide frequency range, and provide good noise performance.

On the other hand, in order to provide good noise performance while preventing uneven wear of each of the shoulder blocks 28, it is desirable that the groove width G2 of the second shoulder lateral grooves 27 is 70% to 90% of the groove width G1 of the first shoulder lateral grooves 26.

In a preferred embodiment, on each side of the tire equator C, the total number of the shoulder lateral grooves 25 is two times the total number of the middle oblique grooves 10. In other words, in the middle land portion 6, the middle oblique grooves 10 are disposed at a relatively low density, and thereby, the rigidity of the middle land portion 6 is further increased.

In a further preferred embodiment, the inner ends of the first shoulder lateral grooves 26 with the wider groove width are disposed at such positions so as to smoothly continue to the middle oblique grooves 10 through the shoulder main groove 4. Thereby, the water pushed out from the middle oblique grooves 10 axially outwardly by traveling may be effectively discharged toward the outside of the tread portion 2 from the shoulder main grooves 4 and the first shoulder lateral grooves 26 with the larger groove width.

Figure 5:
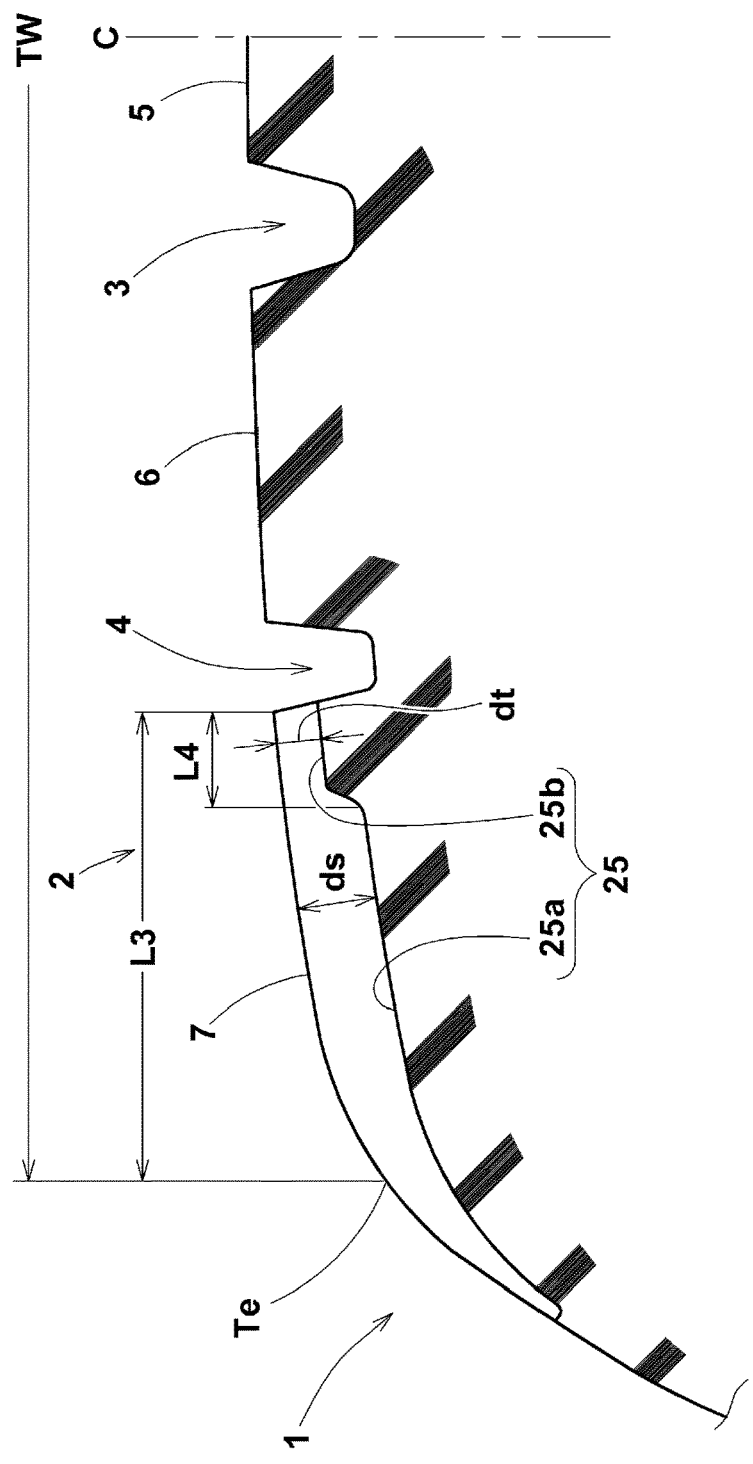
FIG. 5 B-B cross-sectional view of FIG. 1.

In FIG. 5, there is shown B-B sectional view of FIG. 1. The shoulder lateral groove 25 comprises
a base part 25a having a maximum groove depth (ds), and
an inner shallow bottom portion 25b having a smaller groove depth (dt) than the maximum groove depth (ds).

The inner shallow bottom portion 25b is disposed in an inner end side in the tire axial direction of the shoulder lateral groove 25. The inner shallow bottom portion 25b can suppress the deformation in the tire circumferential direction of each of the shoulder blocks 28 at the time of driving and braking, while maintaining the drainage performance, and effectively suppress, for example, heel-and-toe wear (H/T wear).

In order to further enhance the above described effect, preferably, the depth (dt) of the inner shallow bottom portion 25b of the shoulder lateral groove 25 is about 30% to 70% of the groove depth of the shoulder main groove 4.

Likewise, the length L4 of the inner shallow bottom portion 25b of the shoulder lateral groove 25 is preferably about 10% to 20% of the length L3 in the tire axial direction of the shoulder main groove 4.

Figure 6:
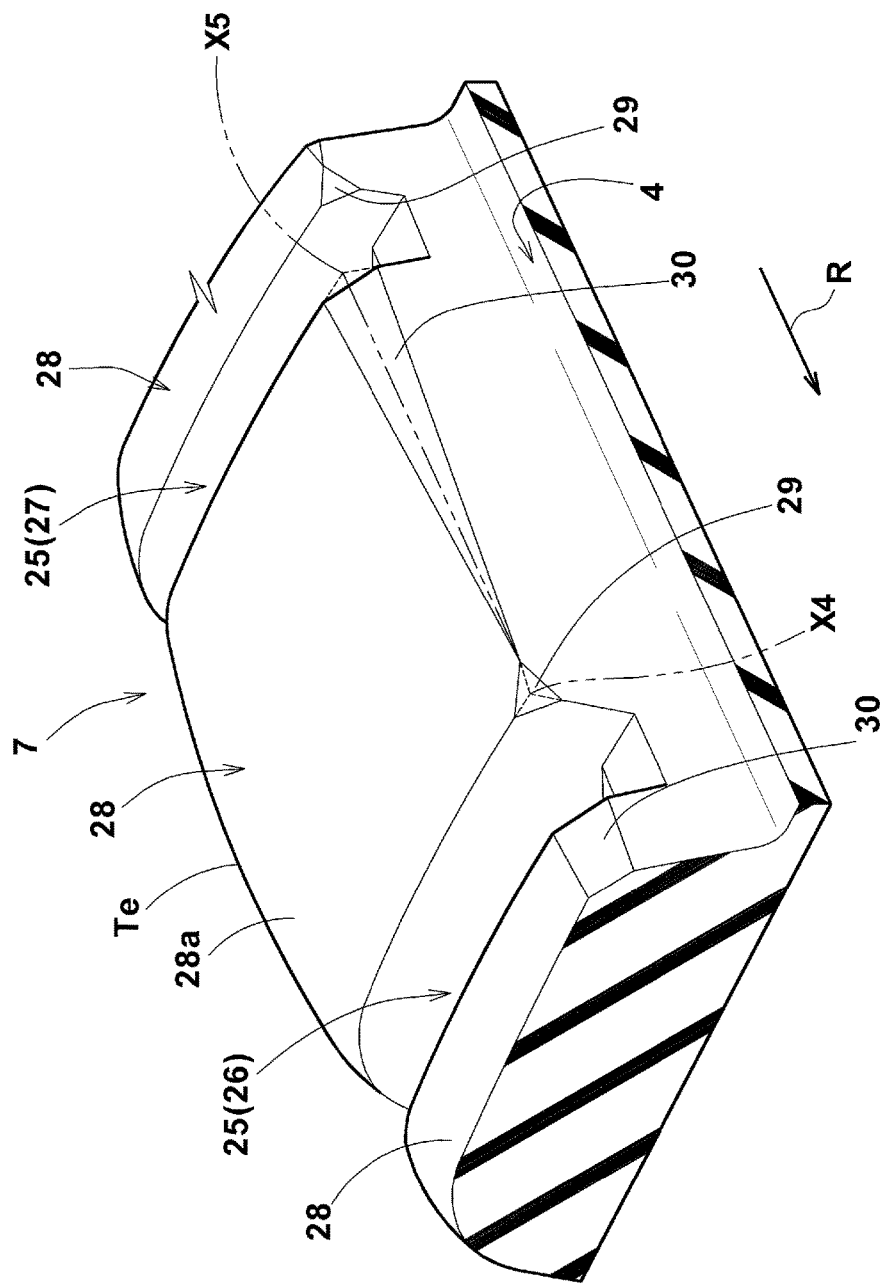
FIG. 6 A partial enlarged perspective view of a shoulder land portion.

In FIG. 6, there is shown a partially enlarged perspective view of the shoulder land portion 7.

In order to further improve the steering stability, the shoulder block 28 may be provided with a fourth chamfered portion 29.

The fourth chamfered portion 29 is disposed in a corner portion X4 formed by the shoulder main groove 4 and the shoulder lateral groove 25 which is on the prior contacting side in the rotation direction R of the shoulder block 28.

The fourth chamfered portion 29 is a slope inclined inwardly in the tire radial direction toward the corner portion X4 from the tread of the shoulder block 28.

The fourth chamfered portion 29 is formed in a triangular shape in the plan view (FIG. 2).

Such fourth chamfered portion 29 suppresses the deformation of the shoulder block 28 in the vicinity of the corner portion X4. Consequently, the ground contact of the shoulder block is improved, and the steering stability is improved.

Further, the fourth chamfered portion 29 can suppress the occurrence of rubber chipping and cracks therein.

In order to further improve the steering stability, the shoulder block 28 may be provided with a fifth chamfered portion 30.

The fifth chamfered portion 30 is provided in a corner portion X5 formed by the shoulder main groove 4 and the shoulder lateral groove 25 which is on the later contacting side in the rotation direction R of the shoulder block 28.

The fifth chamfered portion 30 is a slope inclined inwardly in the tire radial direction from the tread 28a of the shoulder block 28 toward the corner portion X5.

The fifth chamfered portion 30 is formed on the later contacting side in the rotational direction R of the fourth chamfered portion 29, and is formed in a triangular shape in the plan view (FIG. 2) which is longer in the tire circumferential direction and inverted as compared with the fourth chamfered portion 29.

Such fifth chamfered portion 30 suppresses the deformation of the shoulder block 28 even when subjected to a large lateral force during cornering. Consequently, the ground contact of the shoulder block 28 is improved, and the steering stability is improved.

In the tread portion 2 in the present embodiment, employed is a pattern in which a tread half portion on one side of the tire equator c and a tread half portion on the other side of the tire equator c have shapes which are substantially line symmetrical about the tire equator C, but are shifted in the tire circumferential direction.

In such pattern, as the middle oblique grooves 10 and the shoulder lateral grooves 25 on both sides of the tire equator C contact with the ground with mutual positional shifts, better noise performance can be obtained.

While detailed description has been made of the embodiments of the present invention, the present invention can be embodied in various forms without being limited to the illustrated embodiment.

WORKING EXAMPLES

In order to confirm the effects of the present invention, passenger car radial tires of size 205/55R16 were experimentally manufactured based on the specification shown in Table 1, and tested for various performances. The test methods are as follows.

<Steering Stability Test>

At a test course, a professional test driver drove a passenger car with test tires mounted under the following conditions, and sensory evaluated the steering stability of the tire. Results are grades, and the larger value is better.

Rim size: 6.6 J

Internal pressure: 200 kPa

<Noise Performance Test>

The pass-by noise (O.A value) when the passenger car was run on an asphalt road at a speed 60 km/h was measured. The smaller value is better.

<Wear Test>

Using a wear energy testing machine, the heel-and-toe wear (H/T wear) was measured. Results are index numbers of the wear energy values, and the smaller value is better.

The test results are shown in Table 1.

TABLE 1

|  | comparative ex. 1 | comparative ex. 2 | working ex. 1 | working ex. 2 | working ex. 3 | working ex. 4 | working ex. 5 | working ex. 6 | working ex. 7 |
|---|---|---|---|---|---|---|---|---|---|
| distance between middle oblique groove's inner end and center main groove D/Wm (%)" | 0 | 33 | 33 | 33 | 33 | 33 | 33 | 33 | 33 |
| middle oblique groove's outer shallow bottom portion length (mm) | 0 | 0 | 6 | 6 | 6 | 6 | 6 | 6 | 6 |
| sipe of middle oblique groove's outer shallow bottom portion | absent | absent | present | present | present | present | present | absent | present |
| middle oblique groove's inner shallow bottom portion length (mm) | zero | zero | zero | zero | zero | zero | zero | zero | 10 |
| center lug groove length L/Wc (%) | 25 | 25 | 25 | 25 | 25 | 35 | 0 | 25 | 25 |
| shoulder lateral groove angle α3 (deg.) | 75 | 85 | 85 | 85 | 75 | 85 | 85 | 85 | 85 |
| shoulder lateral groove width ratio G2/G1 (%) | 95 | 75 | 75 | 60 | 75 | 75 | 75 | 75 | 75 |
| Steering stability (grade) | 6.0 | 6.5 | 7.0 | 7.0 | 7.0 | 6.8 | 6.7 | 7.0 | 7.5 |
| noise performance (dB) | 63.0 | 61.0 | 61.0 | 60.5 | 61.0 | 61.0 | 61.0 | 62.0 | 61.0 |
| wear energy index | 3.0 | 1.5 | 1.5 | 2.5 | 2.0 | 1.5 | 1.5 | 1.5 | 1.5 |

From the test results, it was confirmed that the working example tires were significantly improved in the steering stability as compared with the comparative examples.

DESCRIPTION OF THE SYMBOLS 1 pneumatic tire
2 tread portion
3 center main groove
4 shoulder main groove
5 center land portion
6 middle land portion
7 shoulder land portion
10 middle oblique groove
12 outer shallow bottom portion
13 sipe
14 inner shallow bottom portion
15 deepest part
23 center lug groove
25 shoulder lateral groove
26 first shoulder lateral grooves
27 second shoulder lateral groove
dm maximum groove depth

The invention claimed is:

1. A pneumatic tire in which, by being provided with a pair of center main grooves disposed on both sides of the tire equator and a pair of shoulder main grooves disposed on both sides of the center main grooves,
the tread portion is provided on both sides of the tire equator with middle land portions which are defined between the center main grooves and the shoulder main grooves,
wherein
each of the middle land portions is provided with a plurality of middle oblique grooves,
each of the middle oblique grooves extends toward the tire equator from an axially outer end communicating with the shoulder main groove, and terminates so that an axially inner end does not communicate with the center main groove, and
an outer end side of the middle oblique groove is provided with an outer shallow bottom portion having a groove depth smaller than the maximum groove depth of the middle oblique groove,
wherein
the groove bottom surface of the outer shallow bottom portion is provided with a sipe extending along the middle oblique groove.

2. The pneumatic tire as set forth in claim 1, wherein the inner end side of the middle oblique groove is provided with an inner shallow bottom portion having a depth smaller than the maximum groove depth of the middle oblique groove.

3. The pneumatic tire as set forth in claim 2, wherein the depth of the above-mentioned inner shallow bottom portion is smaller than the depth of the above-mentioned outer shallow bottom portion.

4. The pneumatic tire as set forth in claim 1, wherein the tread portion is provided between the center main grooves with a center land portion, and
the center land portion is a rib provided with center lug grooves extending from the center main grooves and terminating without reaching to the tire equator.

5. The pneumatic tire as set forth in claim 4, wherein the length in the tire axial direction of the center lug grooves is not more than 30% of the width of the center land portion.

6. A pneumatic tire in which, by being provided with a pair of center main grooves disposed on both sides of the tire equator and a pair of shoulder main grooves disposed on both sides of the center main grooves, the tread portion is provided on both sides of the tire equator with middle land portions which are defined between the center main grooves and the shoulder main grooves,
wherein
each of the middle land portions is provided with a plurality of middle oblique grooves,
each of the middle oblique grooves extends toward the tire equator from an axially outer end communicating with the shoulder main groove, and terminates so that an axially inner end does not communicate with the center main groove, and
an outer end side of the middle oblique groove is provided with an outer shallow bottom portion having a groove depth smaller than the maximum groove depth of the middle oblique groove,
wherein
the tread portion is provided on the outside of each of the shoulder main grooves with a shoulder land portion,
each of the shoulder land portions is provided with a plurality of shoulder lateral grooves,
the shoulder lateral grooves include first shoulder lateral grooves, and second shoulder lateral grooves whose width is smaller than the first shoulder lateral grooves, and the first shoulder lateral grooves and the second shoulder lateral grooves are arranged alternately in the tire circumferential direction,
wherein
the groove width of the second shoulder lateral grooves is 70% to 90% of the groove width of the first shoulder lateral grooves.

7. The pneumatic tire as set forth in claim 6, wherein
the shoulder lateral grooves extend to the tread edges of the tread portion, and
the angle of the shoulder lateral grooves with respect to the tire circumferential direction is not less than 80 degrees at the tread edges.

\* \* \* \* \*